US005214499A

United States Patent [19]
Gleim et al.

[11] Patent Number: 5,214,499
[45] Date of Patent: May 25, 1993

[54] SYSTEM FOR MAKING RASTER LOCATION ADJUSTMENTS ON A MULTI-COLOR DISPLAY SCREEN

[75] Inventors: Gunter Gleim, Villigen; Jacques Chauvin, Monchweiler, both of Fed. Rep. of Germany

[73] Assignee: Deutsche Thomson-Brandt GmbH, Villingen, Fed. Rep. of Germany

[21] Appl. No.: 857,405

[22] Filed: Mar. 25, 1992

[30] Foreign Application Priority Data

Sep. 19, 1990 [DE] Fed. Rep. of Germany ....... 3931154

[51] Int. Cl.⁵ .......................................... H04N 17/02
[52] U.S. Cl. ..................... 358/10; 340/709; 315/368.11; 358/65
[58] Field of Search .................. 340/709, 706; 358/65, 358/64; 315/368.11

[56] References Cited

U.S. PATENT DOCUMENTS

| | | | |
|---|---|---|---|
| 3,609,749 | 9/1971 | McClelland | 340/709 |
| 4,467,322 | 8/1984 | Bell et al. | 340/709 X |
| 4,987,527 | 1/1991 | Hamada et al. | 340/709 X |

Primary Examiner—James J. Groody
Assistant Examiner—Mark R. Powell
Attorney, Agent, or Firm—Joseph S. Tripoli; Joseph J. Laks; Daniel E. Sragow

[57] ABSTRACT

A system for making location adjustments on a display screen raster having horizontal and vertical lines crossing at crossing points includes a cursor which is moveable to the crossing points. The visibility of the cursor is enhanced because the horizontal and vertical lines are brighter than the cursor. The visibility of the cursor can be further enhanced by making the brightness of the cursor adjustable.

3 Claims, 1 Drawing Sheet

SYSTEM FOR MAKING RASTER LOCATION ADJUSTMENTS ON A MULTI-COLOR DISPLAY SCREEN

This is a continuation of PCT application PCT/EP 90/01534 filed Sep. 11, 1990 by Gunter Gleim and Jacques Chauvin and titled "Grid Correction Device For Television Sets".

The invention is directed to raster correction on the screen of a television receiver, particularly to projection television. Raster correction is generally used for the adjustment of parameters such as screen deflection, north-south, or east-west distortions, pillow distortions, non-linearity of the deflection and other picture geometry faults in the horizontal and vertical directions. A particular field of application is convergence adjustment with a projection television receiver in which three monochromatic pictures are projected onto a screen by three picture tubes, one for each of the three primary colors. It is to be understood that as used herein a television receiver means any type of device having an electronic screen (raster) mode of picture reproduction. The device can be fed with a television broadcast signal or also purely as a monitor by a RGB signal, a CSCC signal or separately with the luminance signal and color sub-carrier of any video signal source.

It is known in the art, that certain crossing points of the raster design can be marked with a faded-in cursor and a particular deflection parameter of a selected point of the picture can be evaluated and a correction value for the point can be determined. The cursor fulfills two functions. The first function is the marking of the position of the portion of the picture for which the correction is required. The second function indicates whether or not correction is necessary and the extent of the correction needed.

The cross-shaped cursor is set to a particular crossing point of the lines and is coincident with the horizontal and vertical lines of the raster. The cursor must be visible so that the user can recognize its particular position within the raster design. Accordingly, in the prior art the brightness of the cursor is chosen to be brighter than the lines. A monochrome cursor, that is, only in Red, Green, Blue can not be used because adjustment of the convergence using the cursor would not be possible. It has become evident that with a brighter cursor a lack of definition can occur through defocussing; the cursor can even effloresce whereby the exact adjustment of the convergence is made difficult by the view of the cursor.

It is the object of the invention to create a better presentation sharpness for the cursor. In the past it has been assumed that because the cursor must be white it must also be brighter than the raster lines in order to distinguish it from the white lines of the raster. However, it has been discovered that a cursor which is not as bright as the raster lines is advantageous and such a cursor can be distinguished from the raster lines. The reduced brightness also results in better definition of the cursor and frequently, depending on the user, improved convergence adjustment. In order to make adjustments to different circumstances possible and in order to adapt to the subjective perception of the user, it is preferable to have the brightness of the cursor manually adjustable. In the prior art it has been assumed that both the lines and the cursor must be white. However, with the invention it is possible to use other colors for evaluating the deflection parameter and for determining the correciton value.

Figure 1:
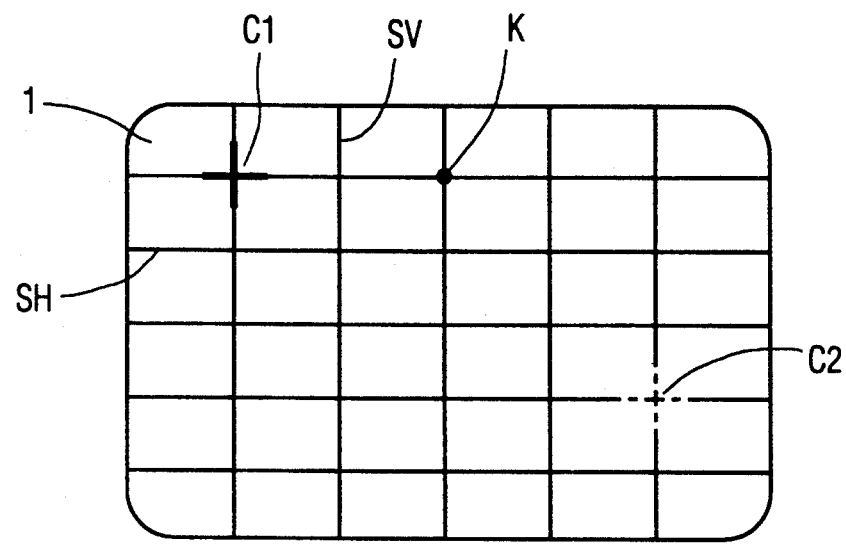
FIG. 1 shows a projection area including the raster pattern.

FIG. 1 shows a projection area 1 onto which a raster design of horizontal bright lines SH and vertical bright lines SV are projected by three monochromatic picture tubes for the primary colors red, green and blue. The lines SH are approximatley the width of a picture line. Also, the lines SH and SV have the same width.

The cruciform cursor C1 can be moved, either incrementally or continuously, to the individual crossing points K with a hand control, for example, a remote-control, whereby the four legs of the cursor C1 coincide with the lines SH and SV. The visibility of the cursor C1 over the lines SH and SV so that the particular position of the cursor C1 can be determined is obtained in known manner in that the cursor C1 is brighter than the lines SH and SV. FIG. 1 also shows a cursor C2 which is not as bright as cursor C1 and which is not as bright as the lines SH and SV, as indicated by the broken lines. Because of the reduced brightness, better marginal sharpness of the cursor is obtained for the individual legs of the cursor C2, and the control and adjustment of the convergence are improved.

Figure 2:
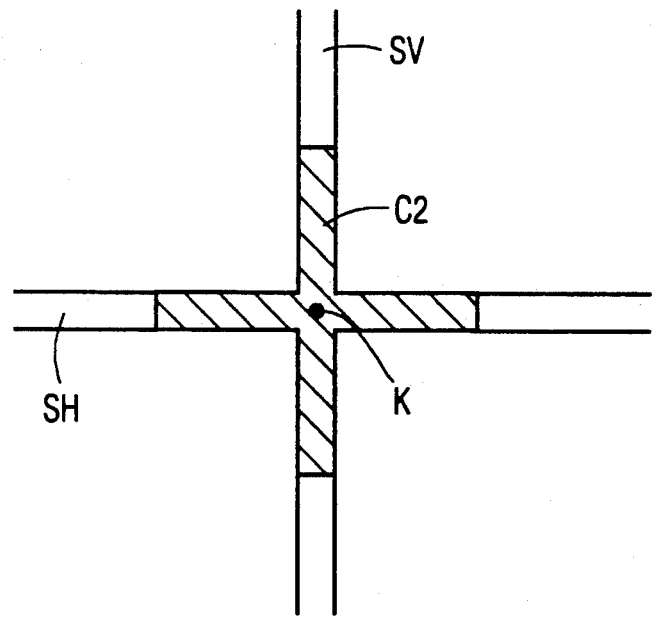
FIG. 2 is an enlarged representation of the cursor at a crossing point of the raster pattern.

FIG. 2 shows an enlarged representation of a horizontal line SH and a vertical line SV in the area of a crossing point K. The cursor C2 overlays the cross point K and is coincident with the lins SH and SV. The hatching indicates that the brightness of the cursor C2 is less than that of the lines SH and SV.

The brightness of the cursor C2 is manually adjustable. Accordingly, adjustments to accommodate for different parameters are possible. For example, adjustments for the brightness of the lines SH, SV, the ambient brightness and the subjective perception of the user can be made. The raster design does not necessarily need to be composed of horizontal lines SH and vertical lines SV other designs can be used. For example, the horizontal lines and the vertical lines can be presented one after the other on the picture area 1. It is also possible to present only crosses with a horizontal and a vertical branch instead of the crossing points K. Alternatively, it is possible to generate diagonal lines on the picture area 1, or to mark certain points, or regions, on the picture area 1 in some other manner which can be reached by the cursor C in order to determine the correction values for the deflection parameter.

We claim:

1. In a system for making raster location adjustments on a multi-color display screen, said raster having horizontal and vertical lines crossing at crossing points, said system including a cursor which is moveable to said crossing points, an improvement wherein said cursor has a brightness level sufficient to detect color convergence, but less than the brightness level of said horizontal and vertical lines.

2. The improvement of claim 1 wherein the brightness of said cursor is adjustable.

3. The improvement of claim 2 wherein said cursor is cross-shaped.

* * * * *